US005949585A

United States Patent [19]
Kittaka

[11] Patent Number: 5,949,585
[45] Date of Patent: Sep. 7, 1999

[54] OPTICS USING GRADED-INDEX LENS

[75] Inventor: Shigeo Kittaka, Osaka, Japan

[73] Assignee: NGB Corporation, Tokyo, Japan

[21] Appl. No.: 09/146,667

[22] Filed: Sep. 3, 1998

[30] Foreign Application Priority Data

Sep. 12, 1997 [JP] Japan .................................... 9-268150
Jul. 17, 1998 [JP] Japan .................................. 10-203244

[51] Int. Cl.⁶ .............................. G02B 3/00; G02B 3/02
[52] U.S. Cl. .......................... 359/654; 359/652; 359/708
[58] Field of Search ................................... 359/652, 654, 359/708

[56] References Cited

U.S. PATENT DOCUMENTS 5,546,229 8/1996 Aoki ........................................ 359/654

Primary Examiner—Georgia Epps
Assistant Examiner—Michael A Lucas
Attorney, Agent, or Firm—Whitham, Curtis & Whitham

[57] ABSTRACT

Optics using a graded-index lens, comprising: a single graded-index lens and a homogeneous plano-convex lens. The single graded-index lens has a refractive index distribution in a radial direction, wherein the graded-index lens has a plane or convexo-spherical lens surface and when its refractive index distribution is expressed by $$n(r)^2 = n_0^2 \cdot \{1 - (g \cdot r)^2 + h_2(g \cdot r)^4 + h_6(g \cdot r)^6 + h_8(g \cdot r)^8 + \cdots\}$$

the following conditions are satisfied, $1.45 \leq n_0 \leq 1.80$, and $0.45 \leq n_0 \cdot r_0 \leq 0.90$, where r is the distance from the optical axis, n(r) is the refractive index at the position distant by r from the optical axis, $n_0$ is the refractive index on the optical axis, $r_0$ is the radius of the graded-index lens, g is an index distribution coefficient, and $h_4$, $h_6$ and $h_8$ are index distribution coefficients. The single homogeneous plano-convex lens has a uniform refractive index, wherein the homogeneous plano-convex lens has its convex surface rendered spherical and opposed to the graded-index lens and is disposed in such a way that its optical axis aligns with the optical axis of the graded-index lens and satisfies the following conditions, $1.40 \leq n \leq 2.20$, and $0.3 \leq r_0 \leq R \leq 2.0 r_0$, where n is the refractive index of the homogeneous plano-convex lens and R is the radius of curvature of the convex surface of the homogeneous plano-convex lens.

5 Claims, 16 Drawing Sheets

OPTICS USING GRADED-INDEX LENS

BACKGROUND OF INVENTION

The present invention relates to optics comprising the combination of a single graded-index lens and a single homogeneous plano-convex lens. More particularly, the invention relates to optics that has its numerical aperture (NA) increased by combining the two lenses in such a way that the convexo-spherical surface of the homogeneous lens is in contact with or slightly spaced from one lens surface of the graded-index lens. The optics is typically useful as an objective lens in an optical head that reads information from an optical disk or writes it into the disk.

In optical disk systems such as a compact disk (CD) apparatus and a digital video disk (DVD) apparatus, information is read from or written into the recording medium by means of an optical head that collects laser light with an objective lens to be focused at a point on the recording surface. In order to increase the density of recording on the medium, the diameter of the beam spot must be reduced. To this end, the objective lens desirably has a large NA on the image side. From the viewpoint of shorter replay and access times, it is also important that the objective lens be smaller in size and lighter in weight.

Under the circumstances, plastic aspheric lenses with NA of about 0.45 have been used as the objective lens for compact disks whereas glass molded aspheric lenses with NA of about 0.60 have been used as the objective lens for digital video disks.

In order to realize more compact recording apparatus that employ optical disks, the size of the objective lens they use must be further reduced. However, aspheric lenses are manufactured by pressing on molds and it is extremely difficult to fabricate microlenses with an outside diameter of 1 mm and less (see "Handbook of Micro-optics", ed. by the Institute of Optics of Japan, p. 6, 1995).

A practical example of the optics with an outside diameter of 1 mm of less is a rod lens having a refractive index distribution in a radial direction. The radial index distribution of the rod lens may be expressed by the following equation:

$$n(r)^2 = n_0^2 \cdot \{1 - (g \cdot r)^2 + h_4 (g \cdot r)^4 + h_6 (g \cdot r)^6 + h_8 (g \cdot r)^8 + \cdots\}$$

where r is the distance from the optical axis, n(r) is the refractive index at the position distant by r from the optical axis, $n_0$ is the refractive index on the optical axis, $r_0$ is the radius of the graded-index lens, g is an index distribution coefficient, and $h_4$, $h_6$ and $h_8$ are index distribution coefficients.

Graded-index lenses of this type are typically manufactured by subjecting a rod of glass to ion exchange and even small-diameter lenses ($\leq 1$ mm in $\phi$) can be fabricated at low cost. In addition, the starting material per se has a positive refractive power, so even a rod lens of a simple shape having a plane surface on both sides can be used as an objective lens. The refractive power of the graded-index lens is expressed by $n_0 \cdot g \cdot r_0$ and the greater its value, the higher the NA of the objective lens that is fabricated. However, there is a limit on the difference in refractive index that can be attained by ion exchange and other fabrication methods and the practically feasible refractive power is not greater than about 0.70 (e.g., $n_0 \cdot g \cdot r_0 \leq 0.70$).

The optics of Comparative Example 1 to be described later in this specification was solely comprised of a graded-index lens having a refractive power ($n_0 \cdot g \cdot r_0$) of 0.68 and its NA value was 0.624 on the image side. When one lens surface of the graded-index lens with $n_0 \cdot g \cdot r_0 = 0.68$ was rendered spherical as in Comparative Example 2 also to be described below, the NA on the image side increased to 0.680.

However, the development of objective lens optics having an even greater value of NA is desired in order to achieve a further increase in the recording density. Aberrations are generally prone to occur in high-NA lenses, so it is also necessary to provide a certain measure for reducing the intensity of aberrations. What is more, in order to realize a compact apparatus and provide a faster access time at the same time, reduction in size and weight is also required.

SUMMARY OF INVENTION

An object, therefore, of the present invention is to provide objective lens optics the NA of which can be increased without increasing aberrations and which, in addition, can be manufactured in a compact size.

The object of the invention can be attained by optics using a graded-index lens which comprises a single graded-index lens having a refractive index distribution in a radial direction; and a single homogeneous plano-convex lens having a uniform refractive index, wherein:

(1) the graded-index lens has a plane or convexo-spherical lens surface and when its refractive index distribution is expressed by $$n(r)^2 = n_0^2 \cdot \{1 \cdot (g \cdot r)^2 + h_4 (g \cdot r)^4 + h_6 (g \cdot r)^6 + h_8 (g \cdot r)^8 + \cdots\}$$

the following conditions are satisfied:

$$1.45 \leq n_0 \leq 1.80$$

$$0.45 \leq n_0 \cdot g \cdot r_0 \leq 0.90$$

where r is the distance from the optical axis, n(r) is the refractive index at the position distant by r from the optical axis, $n_0$ is the refractive index on the optical axis, $r_0$ is the radius of the graded-index lens, g is an index distribution coefficient, and $h_4$, $h_6$ and $h_8$ are index distribution coefficients; and (2) the homogeneous plano-convex lens has its convex surface rendered spherical and opposed to the graded-index lens and is disposed in such a way that its optical axis aligns with the optical axis of the graded-index lens and satisfies the following conditions:

$$1.40 \leq n \leq 2.20$$

$$0.3r \leq R \leq 2.0 r_0$$

where n is the refractive index of the homogeneous plano-convex lens and R is the radius of curvature of the convex surface of the homogeneous plano-convex lens.

The term "the radius of the graded-index lens $r_0$" as used herein means the radius of a portion that works effectively as a lens. The "effective lens diameter" may be defined as "the range in which the amount of RMS wave front aberration on the optical axis is not more than $0.07\lambda$". The radius of the graded-index lens $r_0$ affects its refractive power and, hence, is a numeric value that provides a reference in design. However, in the actual production of graded-index lenses, the lens periphery has an index distribution that greatly departs from the design value and it often fails to be effective as a lens. Take, for example, a lens that has a design outside diameter of 1 mm; in practice, its effective lens diameter may be 0.8 mm and in this case $r_0$ is 0.4 mm.

From the viewpoint of an assembling operation, the lens surface of the graded-index lens is desirably brought into contact with the convex surface of the homogeneous plano-convex lens; however, the two lens surfaces may be slightly spaced from each other without introducing any change in the optical performance of the optics comprising the two lenses. In a typical case, the graded-index lens is disposed on the object side and the plane surface of the homogeneous plano-convex lens on the image side and the resulting optics may be used as an objective lens. Conversely, if the homogeneous plano-convex lens is disposed such that its plane surface is on the object side whereas the graded-index lens on the image side, the resulting optics can be used as a light-collecting lens or collimator.

The on-axis refractive index $n_0$ of the graded-index lens to be used in the invention is specified to be within the range of $1.45 \leq n_0 \leq 1.80$ since this is the practical range where the graded-index lens can be manufactured by industrial techniques such as ion exchange. The value of $n_0 \cdot g \cdot r_0$ which corresponds to the refractive power of the graded-index lens is specified to be between 0.45 and 0.90. Below 0.45, large enough NA cannot be attained. Above 0.90, the index difference is too great to enable the manufacture of the desired lens by ion exchange and other practical techniques.

The radius of the graded-index lens is desirably within the range of $0.05 \text{ mm} \leq r_0 \leq 0.50 \text{ mm}$. In order to realize smaller optics than has been available in the conventional one, $r_0$ must not be greater than 0.5 mm. On the other hand, a graded-index lens that is smaller than 0.05 mm in $r_0$ is extremely difficult to manufacture. From the viewpoint of making smaller and lighter optics, a more preferred range is $0.05 \text{ mm} \leq r_0 \leq 0.3 \text{ mm}$.

In the present invention, the spherical aberration that will develop in the whole system of the optics is corrected by index distribution coefficients $h_4$, $h_6$, $h_8$, $\cdots$. For the sake of simplicity, let us assume that the terms involving $h_6$ and higher-order coefficients are zero and approximate the index distribution of the graded-index lens by $n(r)^2 = n_0^2 \cdot \{1-(g \cdot r)^2 + h_4(g \cdot r)^4\}$. In this case, the value of $h_4$ is desirably in the range of $-3 \leq h_4 \leq 3$. If $h_4$ exceeds 3 or less than $-3$, it is considerably difficult to manufacture the desired graded-index lens.

The homogeneous plano-convex lens to be used in the invention is now discussed. It should first have a refractive index n within the range of $1.40 \leq n \leq 2.20$ in order to permit the use of optical glass or plastics as the material from which the lens can be made. Secondly, the convexo-spherical surface of the lens must have a radius of curvature R within the range of $0.3r_0 \leq R \leq 2.0r_0$. If R is unduly small, it is difficult to produce a unitary assembly with the graded-index lens; if R is excessively large, the homogeneous plano-convex lens is not very effective in increasing NA.

The radius of the homogeneous plano-convex lens is desirably equal to or smaller than that of the mating graded-index lens. Thus, from the viewpoint of making small enough optics, the radius should desirably be not larger than 0.5 mm. By grinding and polishing portions of a ball lens that can be mass-produced, micro-diameter plano-convex lenses can be easily manufactured at low cost even if they are nearly hemispherical in shape.

In the present invention, the graded-index lens is combined with the homogeneous plano-convex lens in order to provide a greater NA. The two lenses are positioned in such a way that the convexo-spherical surface of the homogeneous plano-convex lens is opposed to the graded-index lens while the plane surface to the image plane; this orientation provides an overall shape near a so-called "aplanatic lens", eliminating the possibility for the increase in spherical aberration.

DETAILED DESCRIPTION OF PREFERRED EMBODIMENTS

Figure 1A:
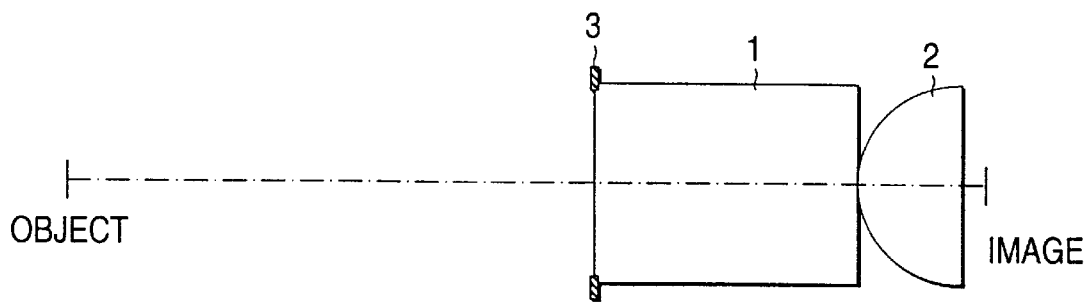
FIG. 1A illustrates the lens configuration of the optics fabricated in Example 1.

The graded-index lens to be used in the invention may assume various geometries; for example, both lens surfaces are planar; either one lens surface is planer and the other surface is convexo-spherical; alternatively, both lens surfaces are convexo-spherical. If at least one lens surface is processed to be spherical, the refractive power can be sufficiently increased to provide a larger NA.

In a typical embodiment, the graded-index lens and the homogeneous plano-convex lens are assembled in an optical head such that one lens surface of the graded-index lens is opposed to the convex surface of the homogeneous plano-convex lens while the other lens surface is directed to the light source, with the plane surface of the homogenous plano-convex lens directed to the recording medium.

The light source used in the embodiment is of a monochromatic type such as a laser that emits monochromatic light. The light source desirably emits at a wavelength λ in the range of 0.3 to 2.0 μm. If the wavelength λ is less than 0.3 μm, the transmittance of the graded-index lens will deteriorate considerably. Beyond 2.0 μm, the light will be focused to produce a beam spot of an undesirably large diameter.

Acocridng to the embodiment of the invnetion, the image side focus point is set at a space of the recording media side in an ordinal optical disk system (a conpact disk apparatus, a DVD apparatus, for instance). However, it may be modified such that the image side focus point coincides with the plane surface of the homogeneous plano-convex lens. In this case, the numerical aperture NA is obtained by:

$$NA = n \times \sin \theta,$$

where θ: Spreading angle of the light which will be collected, and n: Refractive index of homogeneous plano-convex lens. Namely, the NA is larger than that of air (n=1) for the same agnle θ. Consequently, a smaller spot can be obtained.

The recording layer of the media, a photomagnetic disk for instance, is put in close vicinity of the focus point (an area nearer than ¼ wave length of the light source) so that a light density recording can be achieved in use of a seeping light having the same spot radius. This kind of technique is so-called "proximity field recording". Optics according to the present invention can be applied to the technique. Especially, large refractive index is more suitable for the proximity field recording. Preferably, materials (crystals, grass, and the like) for the plano-convex lens having refrective index larger than about 1.9, which is the upper limit value of refractive index of the ordinal optical grass since the large NA is obtained thereby.

Typical design specifications are shown in Tables 1 and 2. All design values are expressed with the radius of the graded-index lens being normalized to unity. The actual values of the radius ($r_0$) of the graded-index lens are within the range of 0.05 to 0.5 mm. Consider the case where the lens radius is 0.2 mm; to obtain the actual lens design values, multiply the values (in millimeters) of the following parameters in Tables 1 and 2 by 0.2: the distance between the object (light source) and the graded-index lens; the radius of the aperture-stop; the radius of the graded-index lens; the radius of curvature of the graded-index lens on the object side; the thickness of the graded-index lens; the radius of curvature or the graded-index lens on the image side; the lens-to-lens distance; the radius of curvature of the homogeneous plano-convex lens; the thickness of the homogeneous plano-convex lens; the distance between the homogeneous plano-convex lens and the image plane (the recording surface of the optical disk); and the focal length. In addition, multiply the index distribution coefficient g (in $mm^{-1}$) by 1/0.2.

The values of the following parameters are dimensionless and need not be changed: the on-axis refractive index $n_0$; $n_0 \cdot g \cdot r_0$; the index distribution coefficient $h_4$, $h_6$; the refractive index of the homogeneous plano-convex lens; NA on the image side.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Distance between object and graded-index lens | 5.200 | 5.200 | 5.200 | 5.200 | 5.200 | 5.200 | infinity | infinity | 5.200 |
| Radiusofaperture-stop | 0.95 | 0.95 | 0.95 | 0.95 | 0.95 | 0.92 | 1.00 | 1.00 | 0.95 |
| Radius of graded-index lens | 1.000 | 1.000 | 1.000 | 1.000 | 1.000 | 1.000 | 1.000 | 1.000 | 1.000 |
| Radius of curvature of graded-index | plane | plane | plane | plane | plane | plane | plane | 2.000 | 2.000 |

TABLE 1-continued

| | Example 1 | Example 2 | Example 3 | Example 4 | Example 5 | Example 6 | Example 7 | Example 8 | Example 9 |
|---|---|---|---|---|---|---|---|---|---|
| lens on object side | surface | surface | surface | surface | surface | surface | surface | | |
| On-axis refractive index $n_0$ | 1.64 | 1.80 | 1.80 | 1.80 | 1.80 | 1.45 | 1.70 | 1.70 | 1.64 |
| Index distribution coefficient g | 0.400 | 0.388 | 0.388 | 0.388 | 0.388 | 0.320 | 0.350 | 0.350 | 0.400 |
| $n_0 \cdot g \cdot r_0$ | 0.656 | 0.698 | 0.698 | 0.698 | 0.698 | 0.464 | 0.595 | 0.595 | 0.656 |
| Index distribution coefficient $h_4$ | 0.650 | 0.800 | 0.884 | 0.619 | 0.885 | 0.910 | 1.090 | 1.260 | 0.330 |
| Thickness of graded-index lens | 2.546 | 2.464 | 3.572 | 4.394 | 3.813 | 4.208 | 3.574 | 1.268 | 1.378 |
| Radius of curvature of graded-index lens on image side | plane surface | plane surface | plane surface | plane surface | plane surface | plane surface | plane surface | plane surface | plane surface |
| Lens-to-lens distance | 0 | 0 | 0 | 0 | 0 | 0 | 0 | 0 | 0 |
| Refrictive index of homogeneous plano-convex lens | 1.52 | 1.60 | 1.90 | 1.40 | 1.40 | 1.64 | 1.52 | 1.52 | 1.52 |
| Radius of curvature of homogeneous plano-convex lens | 1.000 | 1.000 | 2.000 | 0.300 | 0.500 | 1.000 | 0.500 | 1.000 | 1.000 |
| Thickness of homogeneous plano-convex lens | 1.000 | 1.000 | 0.522 | 0.200 | 0.400 | 0.800 | 0.400 | 0.800 | 1.000 |
| Distance between homogeneous plano-convex lens and image plane | 0.240 | 0.226 | 0.256 | 0.010 | 0.100 | 0.287 | 0.091 | 0.192 | 0.233 |
| Focal length | 1.203 | 1.091 | 1.300 | 1.946 | 1.301 | 1.682 | 1.121 | 1.099 | 1.080 |
| NA on image side | 0.733 | 0.796 | 0.756 | 0.831 | 0.849 | 0.711 | 0.843 | 0.808 | 0.756 |

TABLE 2

| | Example 10 | Example 11 | Example 12 | Example 13 | Example 14 | Example 15 | Comparative Example 1 | Comparative Example 2 |
|---|---|---|---|---|---|---|---|---|
| Distance between object and graded-index lens | 5.200 | 5.200 | 5.200 | infinity | 5.200 | 6.000 | 5.200 | 5.200 |
| Radius of aperture-stop | 0.95 | 0.93 | 0.89 | 1.00 | 0.97 | 0.90 | 0.95 | 0.95 |
| Radius of graded-index lens | 1.000 | 1.000 | 1.000 | 1.000 | 1.000 | 1.000 | 1.000 | 1.000 |
| Radius of curvature of graded-index lens on object side | 1.860 | plane surface | plane surface | plane surface | 3.982 | plane surface | plane surface | 1.800 |
| On-axis refractive index $n_0$ | 1.80 | 1.80 | 1.55 | 1.70 | 1.55 | 1.682 | 1.70 | 1.70 |
| Index distribution coefficient g | 0.388 | 0.388 | 0.300 | 0.3000 | 0.300 | 0.369 | 0.400 | 0.400 |
| $n_0 \cdot g \cdot r_0$ | 0.698 | 0.698 | 0.465 | 0.510 | 0.465 | 0.621 | 0.680 | 0.680 |
| Index distribution coefficient $h_4$ | 1.01 | 2.10 | 2.28 | 1.720 | 0.810 | 1.102 | 0.600 | 0.270 |
| Thickness of graded-index lens | 1.456 | 1.497 | 3.756 | 3.359 | 3.000 | 2.544 | 4.217 | 2.884 |
| Radius of curvature of graded-index lens on image side | plane surface | −2.000 | −2.016 | −3.408 | −5.000 | plane surface | plane surface | plane surface |
| Lens-to-lens distance | 0 | 0 | 0 | 0 | 0 | 0 | — | — |
| Refractive index of homogeneous plano-convex lens | 1.50 | 1.50 | 1.50 | 1.50 | 1.50 | 1.893 | — | — |
| Radius of curvature of homogeneous plano-convex lens | 1.000 | 1.000 | 1.000 | 1.250 | 1.000 | 1.184 | — | — |
| Thickness of homogeneous plano-convex lens | 0.800 | 1.025 | 1.000 | 0.800 | 1.100 | 0.800 | — | — |
| Distance between homogeneous plano-convex lens and image plane | 0.199 | 0.200 | 0.178 | 0.174 | 0.198 | 0.373 | 0.235 | 0.202 |
| Focal length | 1.005 | 0.881 | 1.330 | 1.326 | 1.455 | 1.057 | 1.481 | 1.283 |
| NA on image side | 0.791 | 0.803 | 0.790 | 0.708 | 0.699 | 0.853 | 0.624 | 0.680 |

Figure 1B:
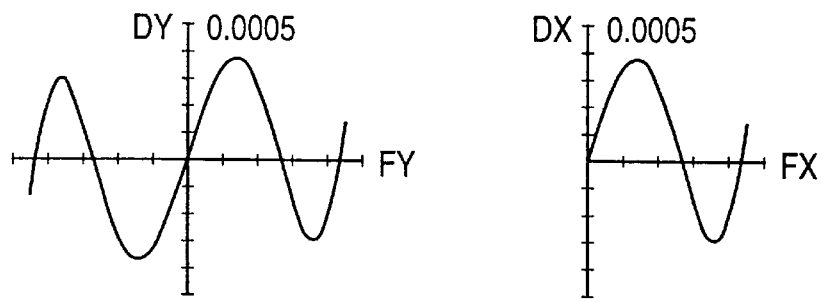
FIG. 1B shows the on-axis aberration occurring in it.
Figure 2A:
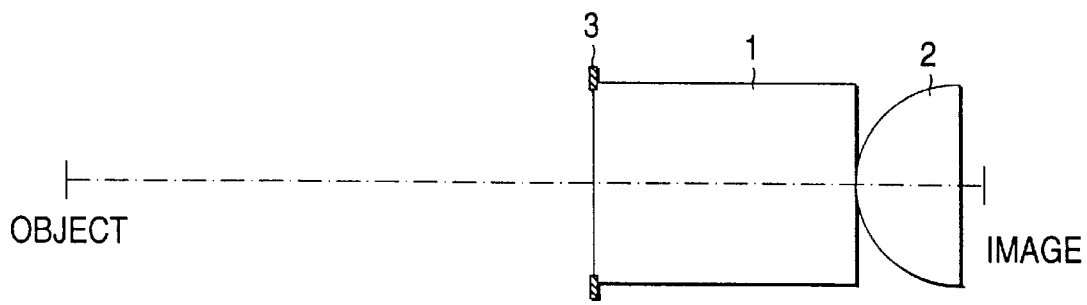
FIG. 2A illustrates the lens configuration of the optics fabricated in Example 2.
Figure 2B:
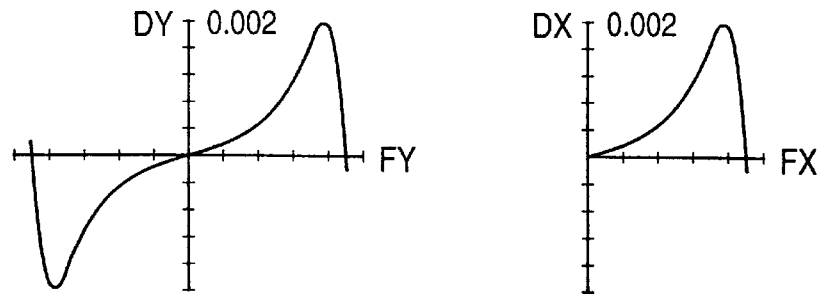
FIG. 2B shows the on-axis aberration occurring in it.
Figure 3A:
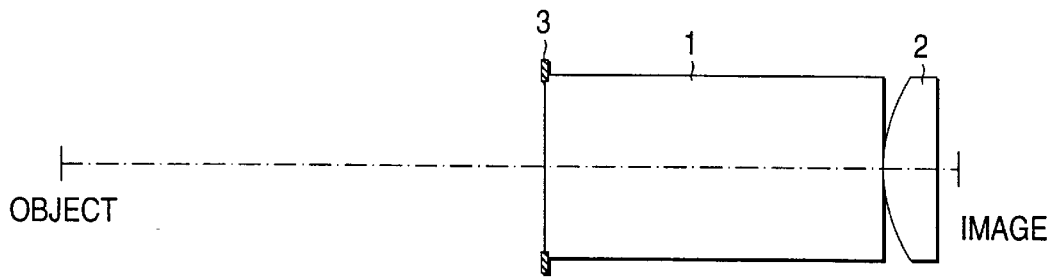
FIG. 3A illustrates the lens configuration of the optics fabricated in Example 3.
Figure 3B:
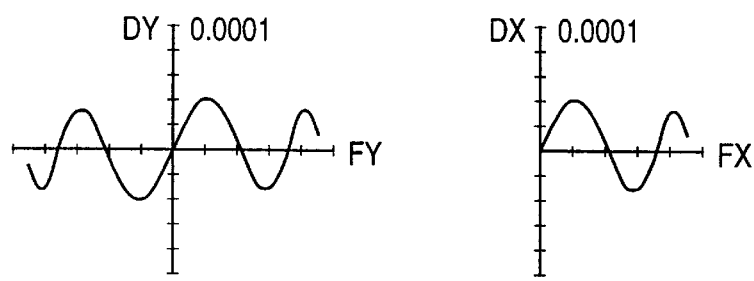
FIG. 3B shows the on-axis aberration occurring in it.
Figure 4A:
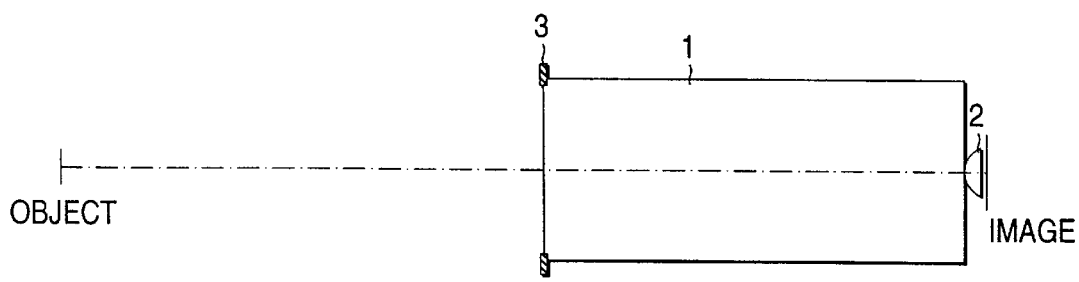
FIG. 4A illustrates the lens configuration of the optics fabricated in Example 4.
Figure 4B:
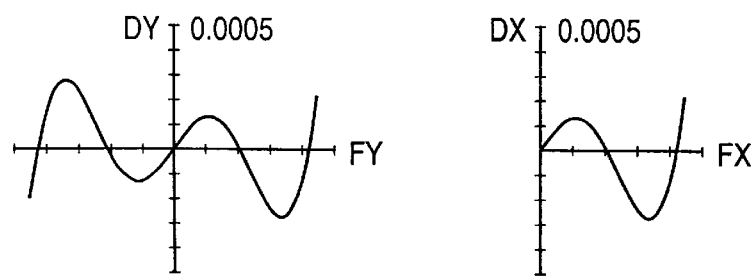
FIG. 4B shows the on-axis aberration occurring in it.
Figure 5A:
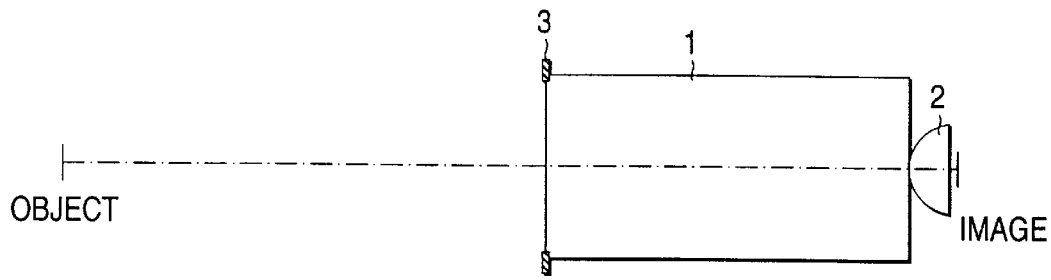
FIG. 5A illustrates the lens configuration of the optics fabricated in Example 5.
Figure 5B:
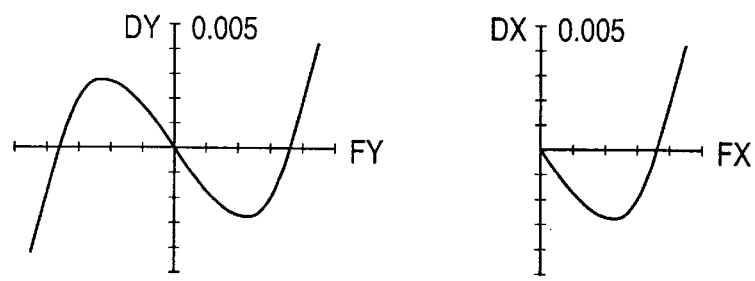
FIG. 5B shows the on-axis aberration occurring in it.
Figure 6A:
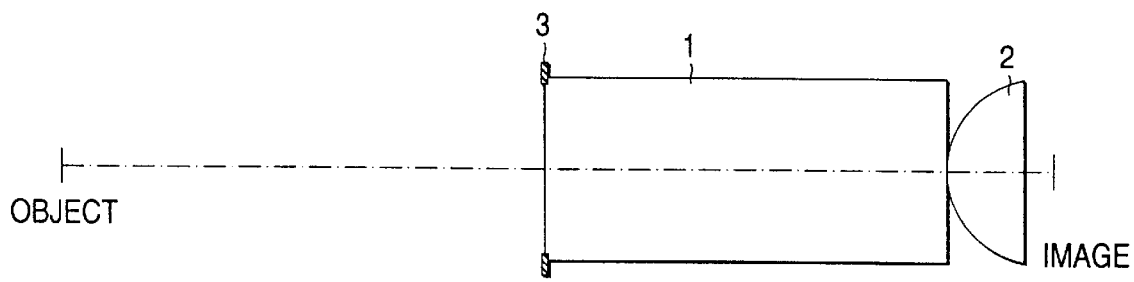
FIG. 6A illustrates the lens configuration of the optics fabricated in Example 6.
Figure 6B:
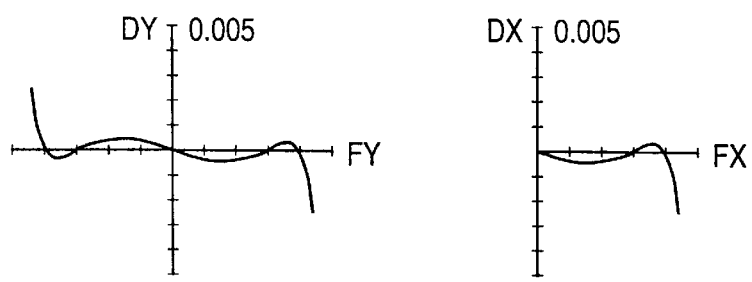
FIG. 6B shows the on-axis aberration occurring in it.
Figure 7A:
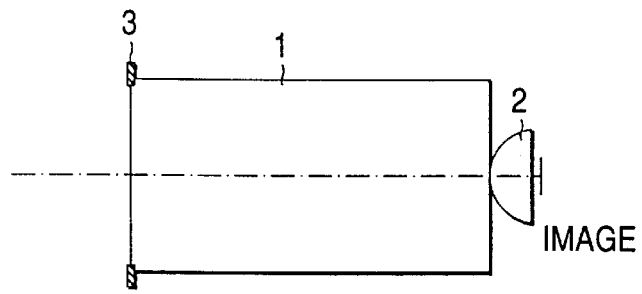
FIG. 7A illustrates the lens configuration of the optics fabricated in Example 7.
Figure 7B:
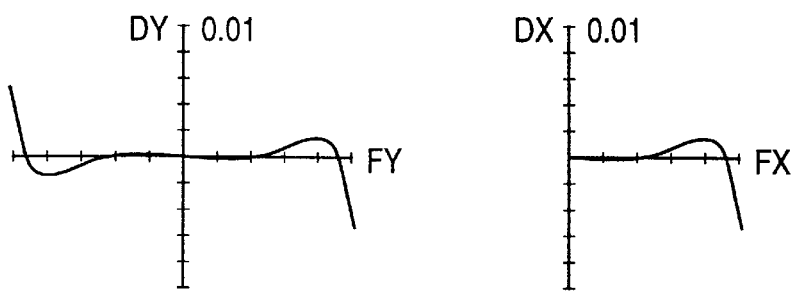
FIG. 7B shows the on-axis aberration occurring in it.
Figure 8A:
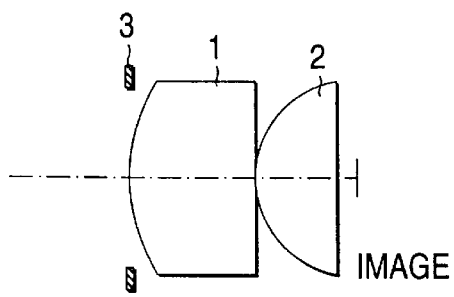
FIG. 8A illustrates the lens configuration of the optics fabricated in Example 8.
Figure 8B:
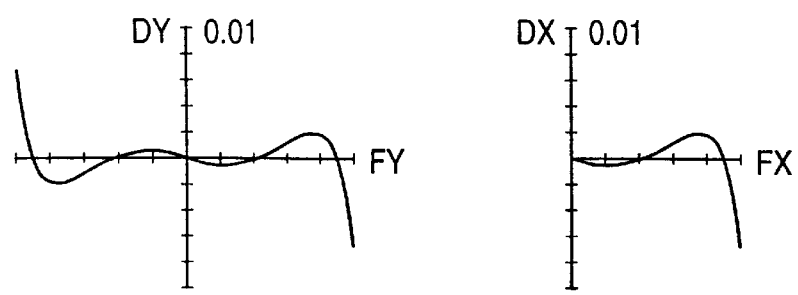
FIG. 8B shows the on-axis aberration occurring in it.
Figure 9A:
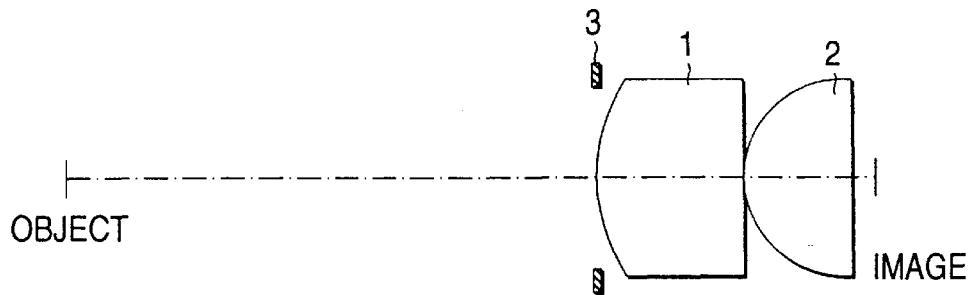
FIG. 9A illustrates the lens configuration of the optics fabricated in Example 9.
Figure 9B:
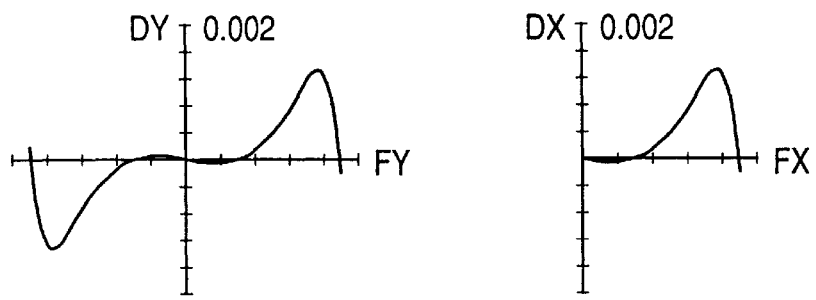
FIG. 9B shows the on-axis aberration occurring in it.
Figure 10A:
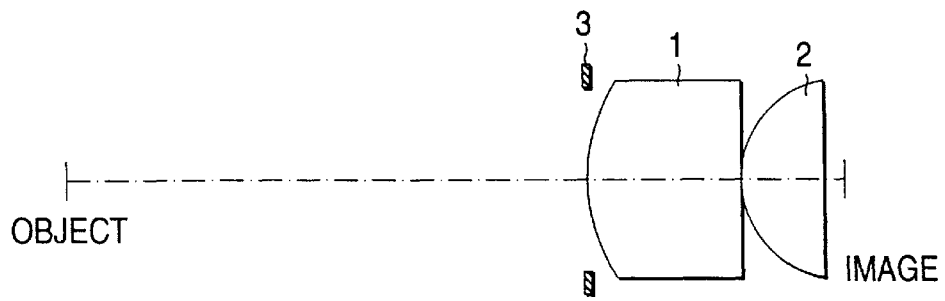
FIG. 10A illustrates the lens configuration of the optics fabricated in Example 10.
Figure 10B:
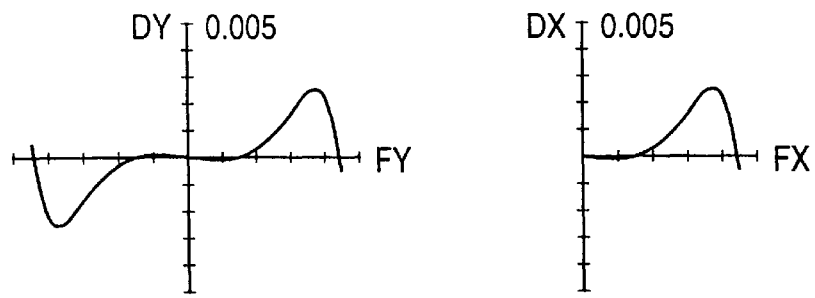
FIG. 10B shows the on-axis aberration occurring in it.
Figure 11A:
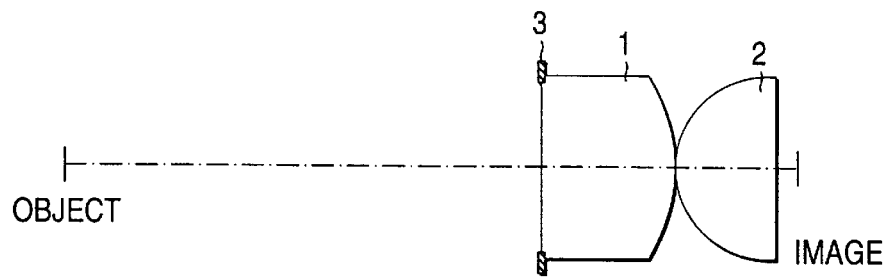
FIG. 11A illustrates the lens configuration of the optics fabricated in Example 11.
Figure 11B:
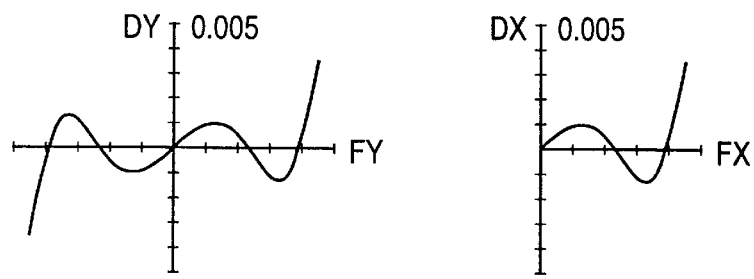
FIG. 11B shows the on-axis aberration occurring in it.
Figure 12A:
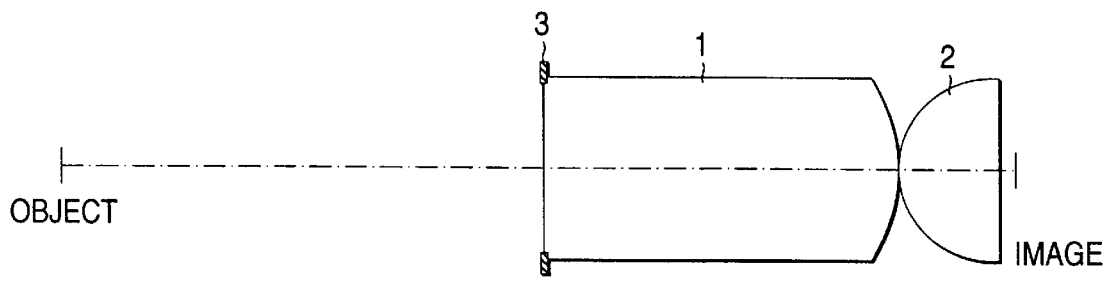
FIG. 12A illustrates the lens configuration of the optics fabricated in Example 12.
Figure 12B:
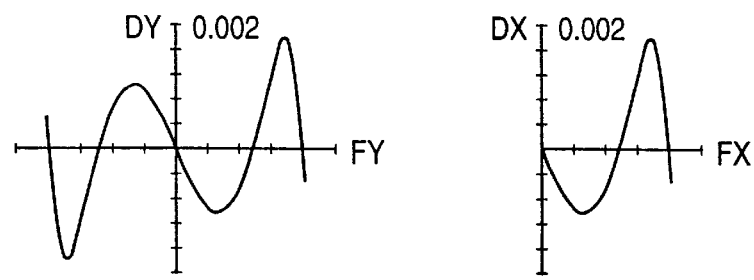
FIG. 12B shows the on-axis aberration occurring in it.
Figure 13A:
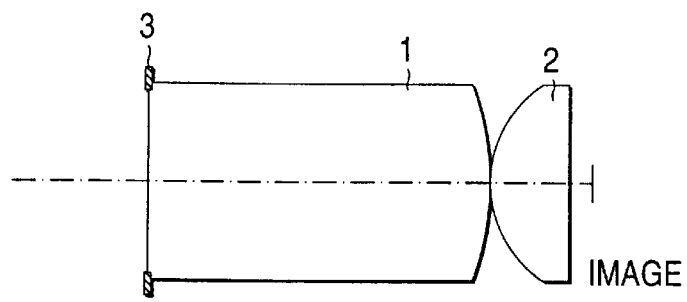
FIG. 13A illustrates the lens configuration of the optics fabricated in Example 13.
Figure 13B:
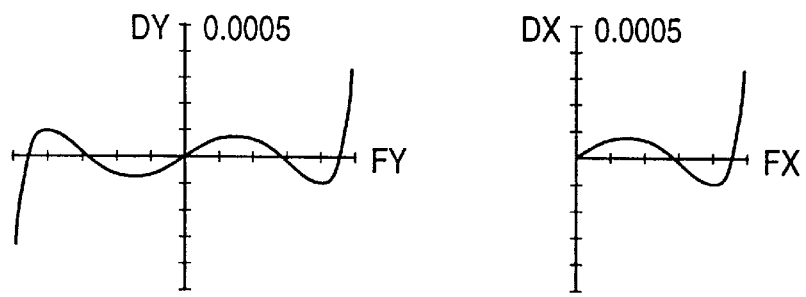
FIG. 13B shows the on-axis aberration occurring in it.
Figure 14A:
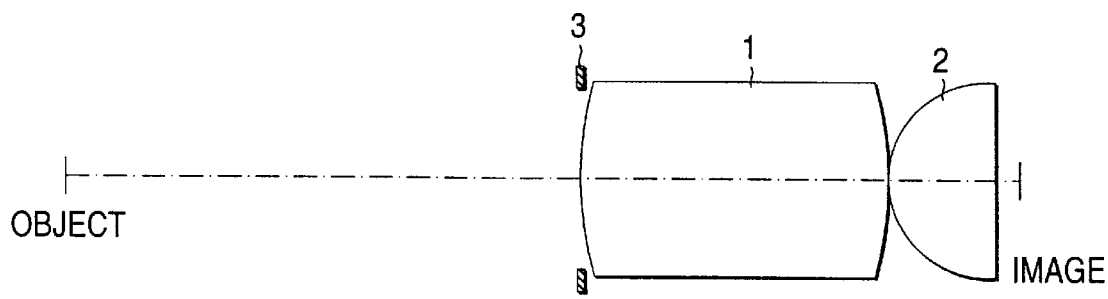
FIG. 14A illustrates the lens configuration of the optics fabricated in Example 14.
Figure 14B:
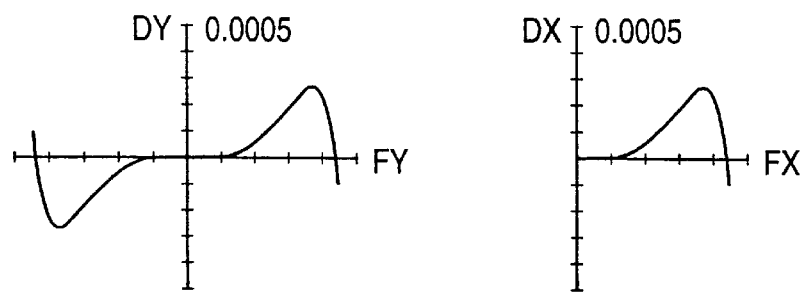
FIG. 14B shows the on-axis aberration occurring in it.
Figure 15A:
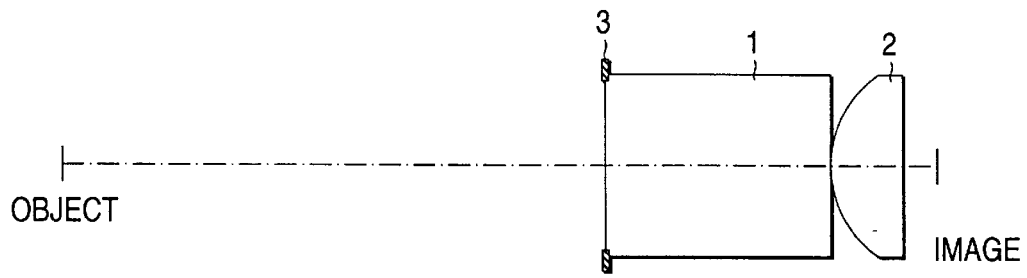
FIG. 15A illustrates the lens configuration of the optics fabricated in Example 15.
Figure 15B:
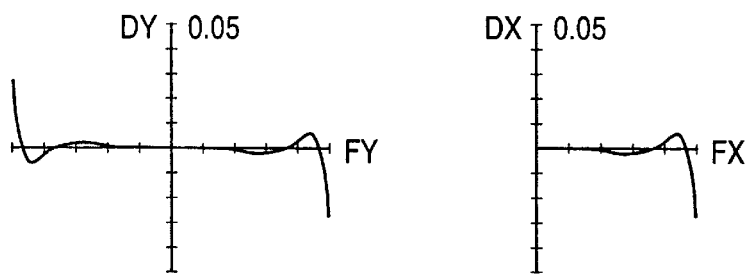
FIG. 15B shows the on-axis aberration occurring in it.

FIGS. 1A to 15B correspond to Examples 1 to 15, respectively, and FIGS. 29A to 30B correspond to Comparative Examples 1 and 2, respectively. These FIGS. 1A, 2A, 3A, . . . , 30A show the lens configuration, and FIGS. 1B, 2B, 3B, . . . , 30B shows the on-axis aberration. In the lens configuration shown by these figures, reference numeral 1 represents the graded-index lens, 2 the homogeneous plano-convex lens, and 3 the aperture-stop. In the aberration shown by these figures, DY and DX represent the amounts of ray displacement in a meridional and a sagittal direction, respectively (assuming that the radius of the graded-index lens is unity), and FX and FY each represent the distance between the incident light and the optical axis at the stop position, with the terminal end of the horizontal axis representing the radius of the stop.

As one can see from Tables 1 and 2, the optics solely composed of the graded-index lens provides NA values of 0.624 (Comparative Example 1) and 0.680 (Comparative Example 2) on the image side. On the other hand, NA values substantially equal to 0.7 and higher can be obtained on the image side by adopting the configuration of the invention. It should be particularly noted that with the lens configurations of Examples 4 and 5, both lens surfaces of the graded-index lens are planar but in spite of this simplicity in shape, NA values of 0.83 and upward can be obtained on the image side. In Example 15, the index distribution coefficient $h_6$ is set to +4.14.

Tables 3 and 4 other design specifications in which the image side focus point positions on the plane surface of the homogeneous plano-convex lens to be suitable for the proximity field recording. Similar to previous examples, all design values are expressed with the radius of the graded-index lens being normalized to unity. The actual values of the radius ($r_0$) of the graded-index lens are within the range of 0.05 to 0.5 mm. The actual lens design values are obtained according to the similar ways of the previous examples.

TABLE 3

|  | Example 16 | Example 17 | Example 18 | Example 19 | Example 20 | Example 21 | Example 22 |
|---|---|---|---|---|---|---|---|
| Distance between object and graded-index lens | 5.200 | 5.200 | 5.200 | 5.200 | infinity | infinity | 5.200 |
| Radius of aperture-stop | 0.95 | 0.95 | 0.95 | 0.95 | 1.00 | 1.00 | 0.95 |
| Radius of graded-index lens | 1.000 | 1.000 | 1.000 | 1.000 | 1.000 | 1.000 | 1.000 |
| Radius of curvature of graded-index lens on object side | plane surface | plane surface | plane surface | plane surface | plane surface | 2.000 | 2.000 |
| On-axis refractive index $n_0$ | 1.64 | 1.80 | 1.80 | 1.80 | 1.70 | 1.70 | 1.64 |
| Index distribution coefficient g | 0.400 | 0.388 | 0.388 | 0.388 | 0.350 | 0.350 | 0.400 |
| $n_0 \cdot g \cdot r_0$ | 0.656 | 0.698 | 0.698 | 0.698 | 0.595 | 0.595 | 0.656 |
| Index distribution coefficient $h_4$ | 0.58 | 0.457 | 0.64 | 0.65 | 0.73 | −0.16 | −0.24 |
| Thickness of graded-index lens | 3.1885 | 1.995 | 4.2085 | 3.6394 | 3.1047 | 1.4353 | 1.4699 |
| Radius of curvature of graded-index lens on image side | plane surface | plane surface | plane surface | plane surface | plane surface | plane surface | plane surface |
| Lens-to-lens distance | 0 | 0 | 0 | 0 | 0 | 0 | 0 |
| Refractive index of homogeneous plano-convex lens | 1.52 | 1.90 | 1.40 | 1.40 | 1.52 | 1.85 | 1.52 |
| Radius of curvature of homogeneous plano-convex lens | 1.000 | 0.800 | 0.300 | 0.500 | 0.500 | 1.000 | 1.000 |
| Thickness of homogeneous plano-convex lens | 1.000 | 1.2571 | 0.300 | 0.600 | 0.700 | 1.000 | 1.300 |
| Distance between homogeneous plano-convex lens and image plane | 0 | 0 | 0 | 0 | 0 | 0 | 0 |
| Focal length | 1.284 | 0.774 | 1.628 | 1.225 | 0.989 | 0.911 | 1.085 |
| NA on image side | 0.753 | 1.274 | 0.890 | 0.863 | 0.909 | 1.025 | 0.791 |

TABLE 4

|  | Example 23 | Example 24 | Example 25 | Example 26 | Example 27 | Example 28 |
|---|---|---|---|---|---|---|
| Distance between object and graded-index lens | 5.200 | infinity | 5.200 | 6.000 | 6.000 | 6.000 |
| Radius of aperture-stop | 0.93 | 1.00 | 0.97 | 0.90 | 0.98 | 0.98 |
| Radius of graded-index lens | 1.000 | 1.000 | 1.000 | 1.000 | 1.000 | 1.000 |
| Radius of curvature of graded-index lens on object side | plane surface | plane surface | 3.982 | plane surface | plane surface | plane surface |
| On-axis refractive index $n_0$ | 1.80 | 0.70 | 1.55 | 1.682 | 1.682 | 1.800 |
| Index distribution coefficient g | 0.388 | 0.300 | 0.300 | 0.369 | 0.440 | 0.500 |
| $n_0 \cdot g \cdot r_0$ | 0.698 | 0.510 | 0.465 | 0.621 | 0.740 | 0.900 |
| Index distribution coefficient $h_4$ | 1.79 | 1.46 | 0.42 | 0.475 | 0.400 | 0.395 |
| Thickness of graded-index lens | 1.8895 | 2.8731 | 2.9918 | 2.544 | 1.5316 | 1.251 |
| Radius of curvature of graded-index lens on image side | −2.00 | −3.410 | −5.000 | plane surface | plane surface | plane surface |
| Lens-to-lens distance | 0 | 0 | 0 | 0 | 0 | 0 |
| Refractive index of homogeneous plano-convex lens | 1.50 | 1.50 | 1.50 | 1.893 | 2.200 | 2.000 |
| Radius of curvature of homogeneous plano-convex lens | 1.000 | 1.250 | 1.000 | 1.184 | 0.800 | 0.75 |
| Thickness of homogeneous plano-convex lens | 1.200 | 1.250 | 1.400 | 1.5115 | 1.1828 | 1.1365 |
| Distance between homogeneous plano-convex lens and image plane | 0 | 0 | 0 | 0 | 0 | 0 |
| Focal length | 0.880 | 1.280 | 1.453 | 1.057 | 0.612 | 0.622 |
| NA on image side | 0.863 | 0.718 | 0.703 | 0.849 | 1.623 | 1.485 |

Figure 16A:
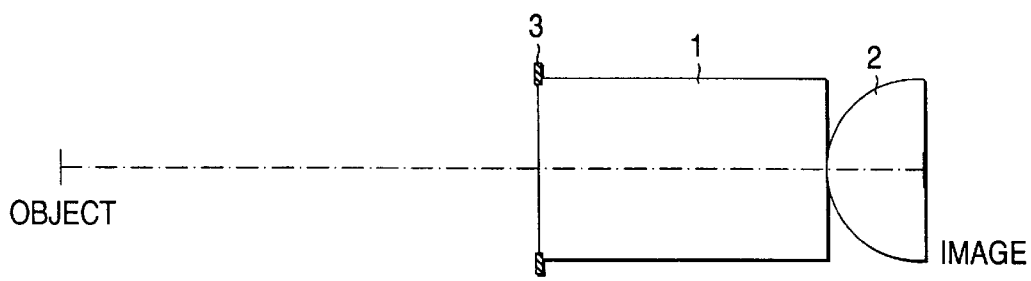
FIG. 16A illustrates the lens configuration of the optics fabricated in Example 16.
Figure 16B:
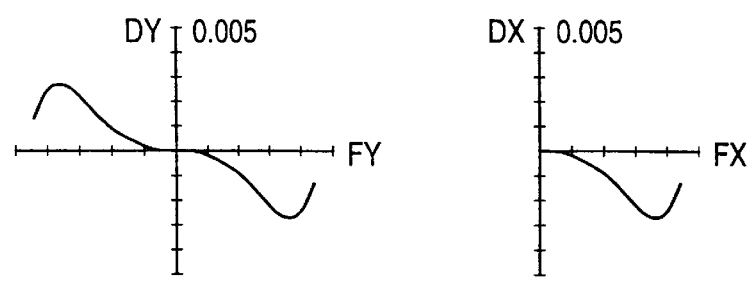
FIG. 16B shows the on-axis aberration occurring in it.
Figure 17A:
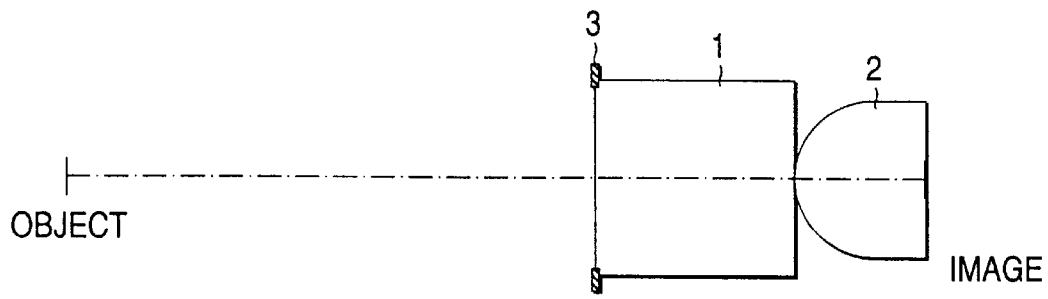
FIG. 17A illustrates the lens configuration of the optics fabricated in Example 17.
Figure 17B:
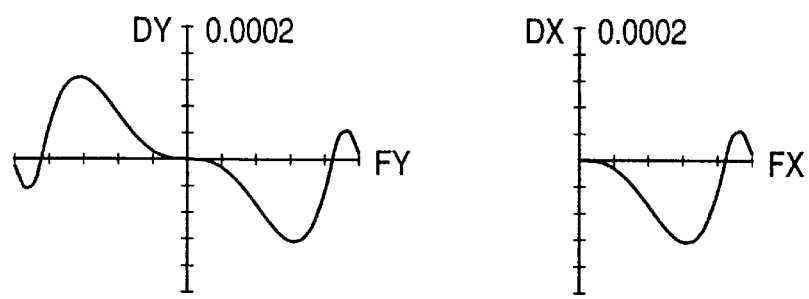
FIG. 17B shows the on-axis aberration occurring in it.
Figure 18A:
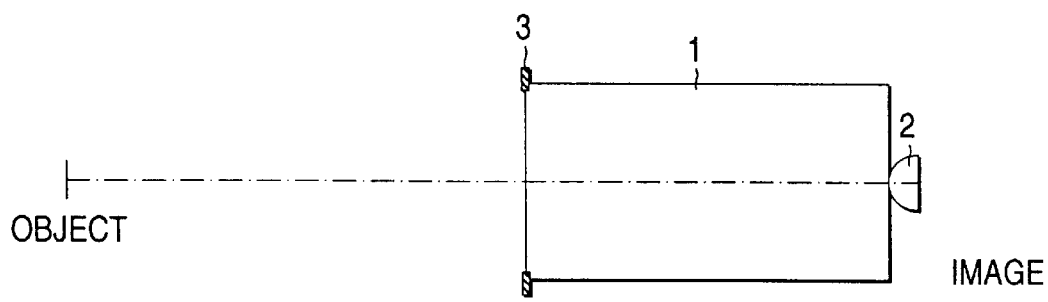
FIG. 18A illustrates the lens configuration of the optics fabricated in Example 18.
Figure 18B:
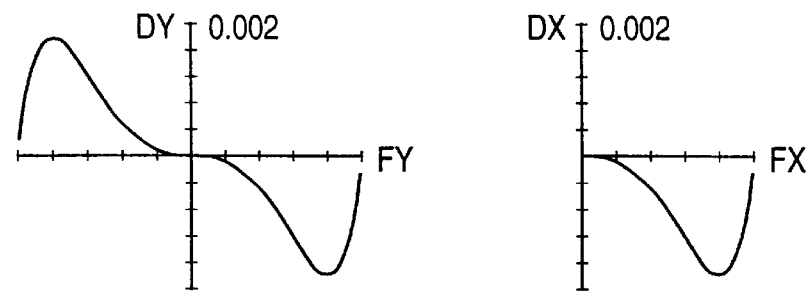
FIG. 18B shows the on-axis aberration occurring in it.
Figure 19A:
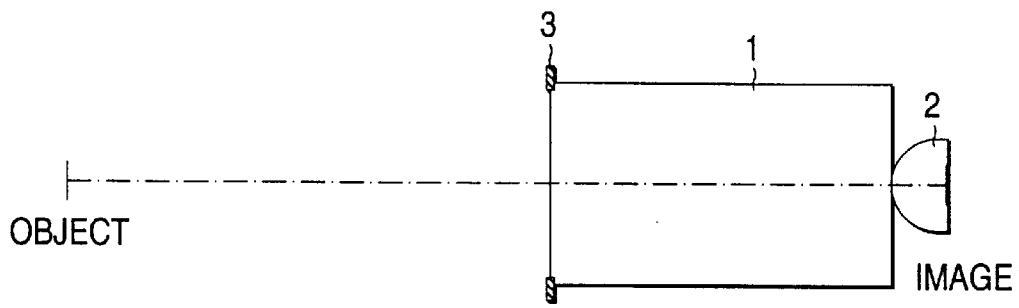
FIG. 19A illustrates the lens configuration of the optics fabricated in Example 19.
Figure 19B:
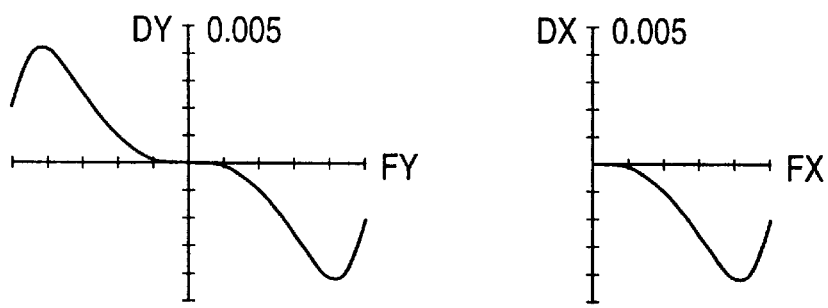
FIG. 19B shows the on-axis aberration occurring in it.
Figure 20A:
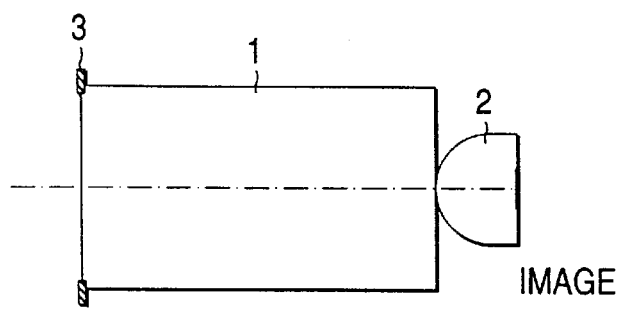
FIG. 20A illustrates the lens configuration of the optics fabricated in Example 20.
Figure 20B:
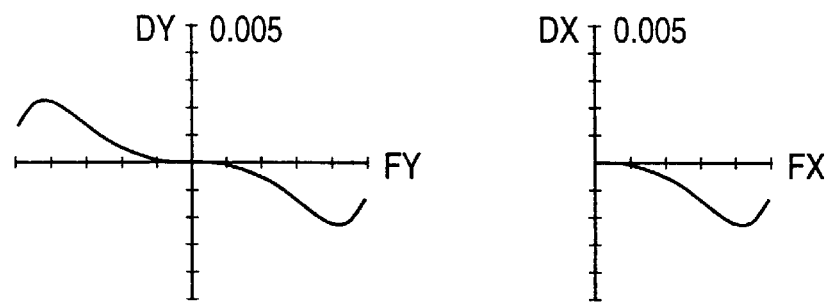
FIG. 20B shows the on-axis aberration occurring in it.
Figure 21A:
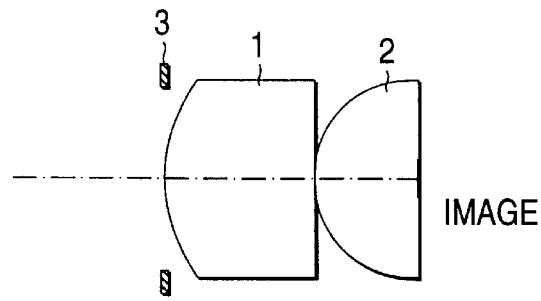
FIG. 21A illustrates the lens configuration of the optics fabricated in Example 21.
Figure 21B:
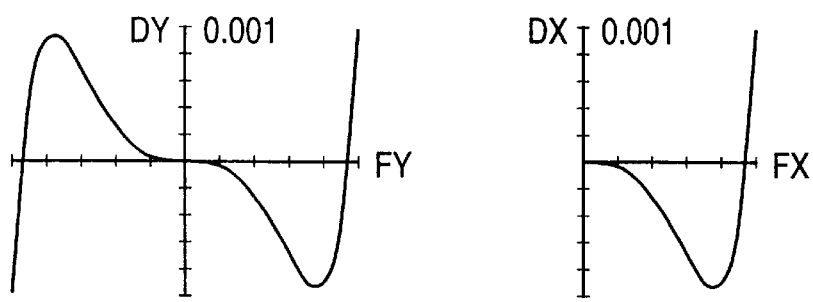
FIG. 21B shows the on-axis aberration occurring in it.
Figure 22A:
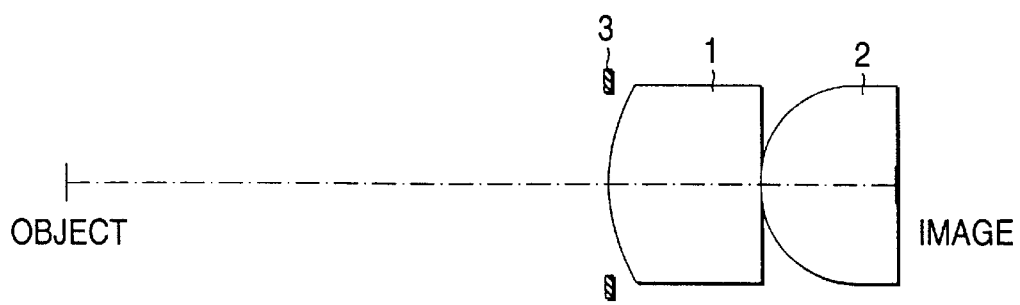
FIG. 22A illustrates the lens configuration of the optics fabricated in Example 22.
Figure 22B:
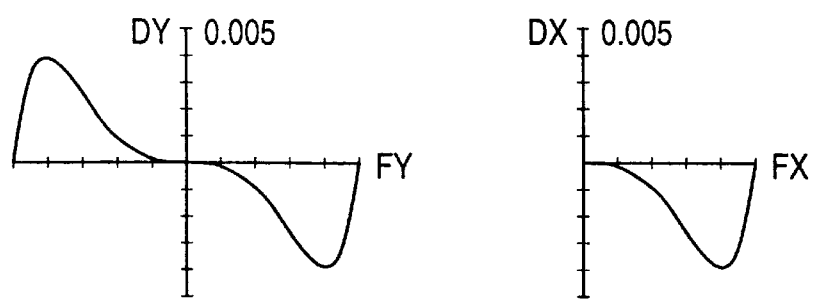
FIG. 22B shows the on-axis aberration occurring in it.
Figure 23A:
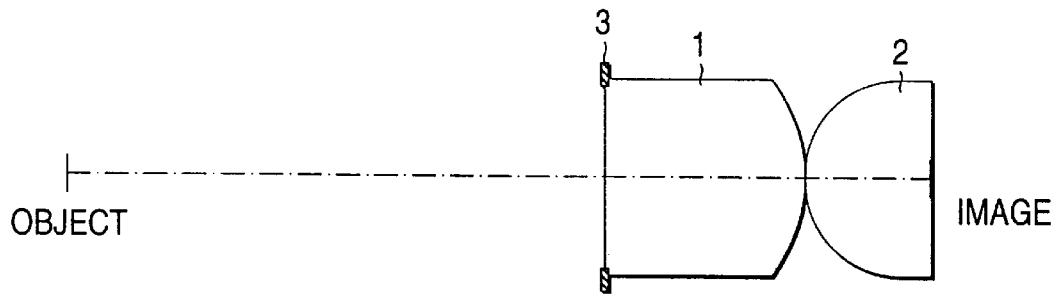
FIG. 23A illustrates the lens configuration of the optics fabricated in Example 23.
Figure 23B:
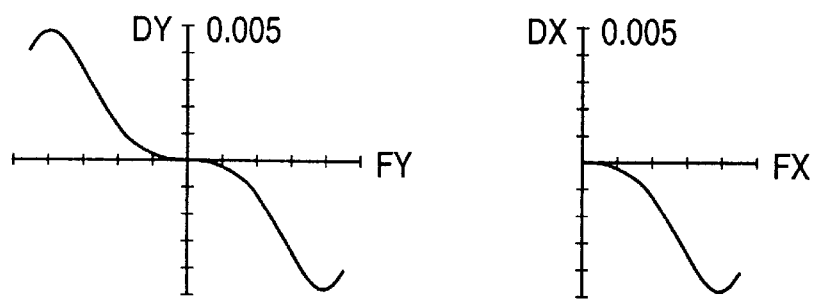
FIG. 23B shows the on-axis aberration occurring in it.
Figure 24A:
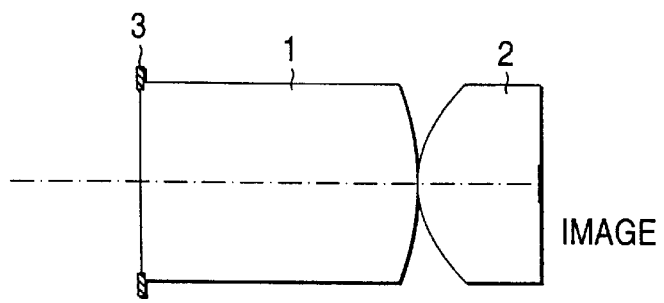
FIG. 24A illustrates the lens configuration of the optics fabricated in Example 24.
Figure 24B:
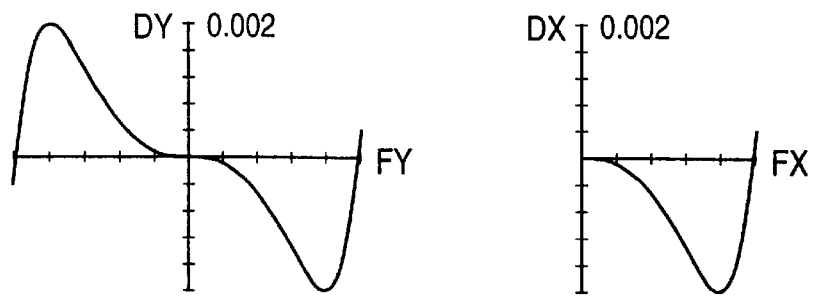
FIG. 24B shows the on-axis aberration occurring in it.
Figure 25A:
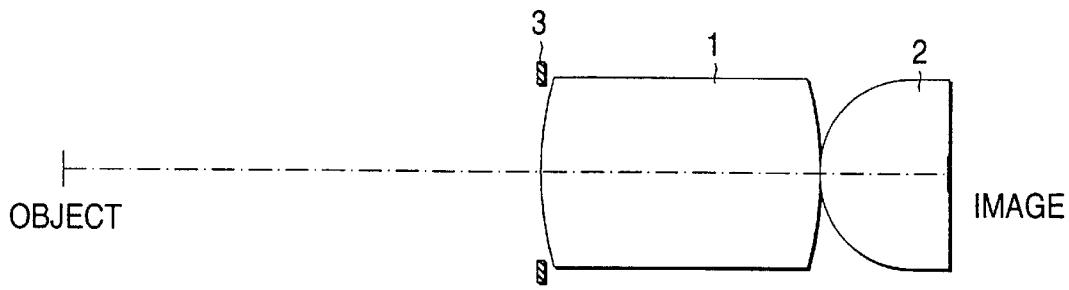
FIG. 25A illustrates the lens configuration of the optics fabricated in Example 25.
Figure 25B:
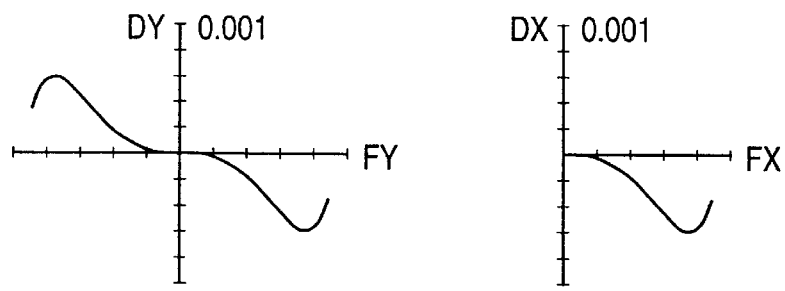
FIG. 25B shows the on-axis aberration occurring in it.
Figure 26A:
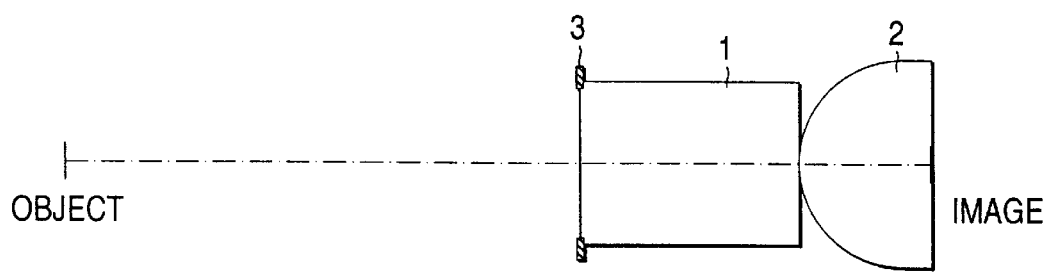
FIG. 26A illustrates the lens configuration of the optics fabricated in Example 26.
Figure 26B:
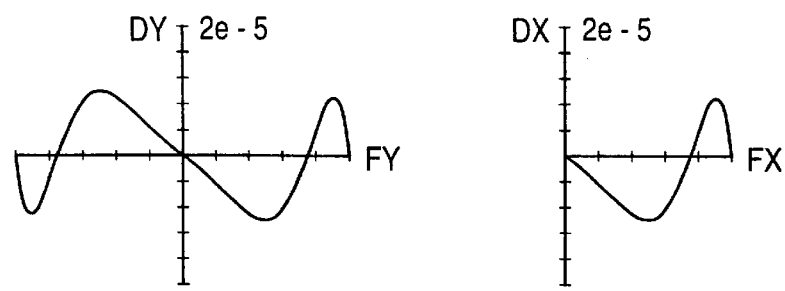
FIG. 26B shows the on-axis aberration occurring in it.
Figure 27A:
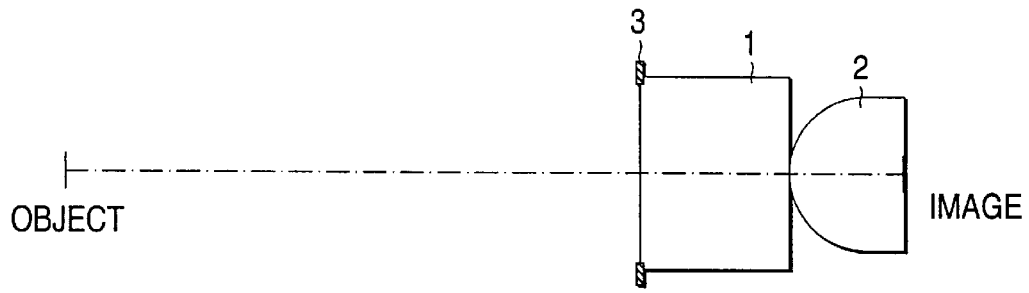
FIG. 27A illustrates the lens configuration of the optics fabricated in Example 27.
Figure 27B:
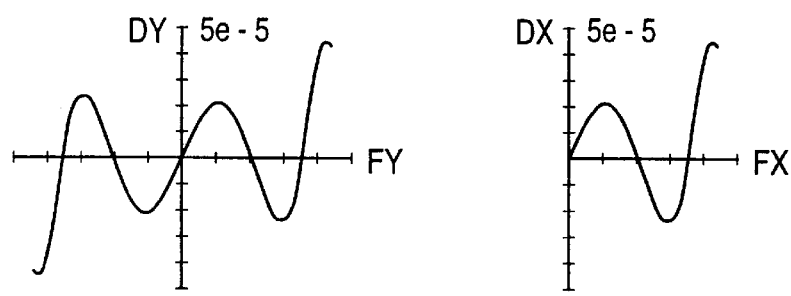
FIG. 27B shows the on-axis aberration occurring in it.
Figure 28A:
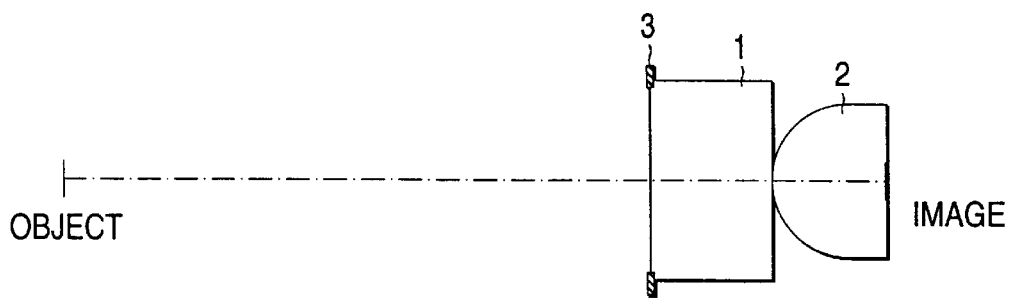
FIG. 28A illustrates the lens configuration of the optics fabricated in Example 28.
Figure 28B:
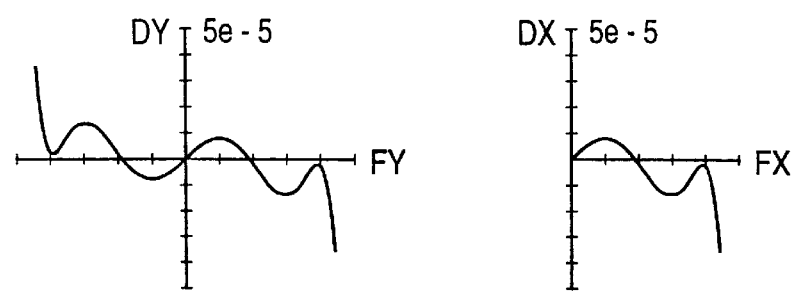
FIG. 28B shows the on-axis aberration occurring in it.
Figure 29A:
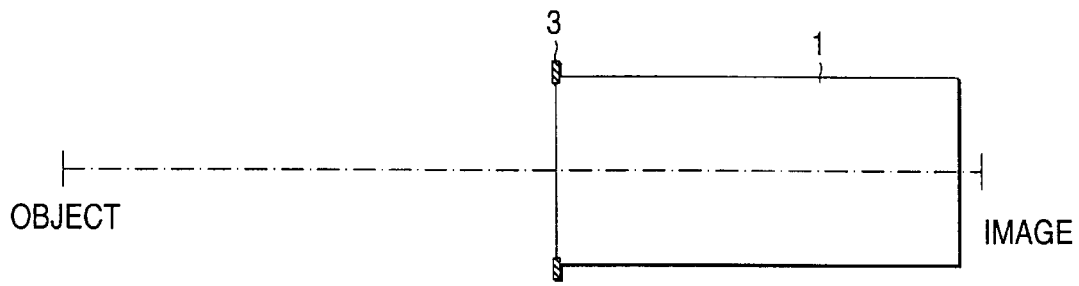
FIG. 29A illustrates the lens configuration of the optics fabricated in Comparative Example 1.
Figure 29B:
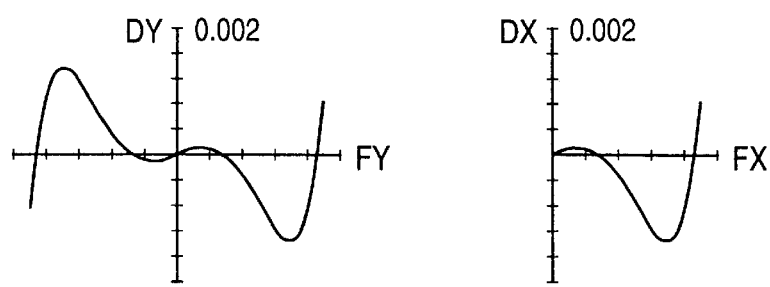
FIG. 29B shows the on-axis aberration occurring in it.
Figure 30A:
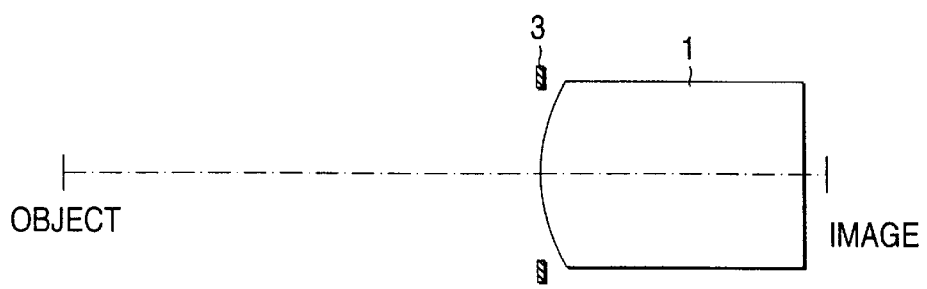
FIG. 30A illustrates the lens configuration of the optics fabricated in Comparative Example 2.
Figure 30B:
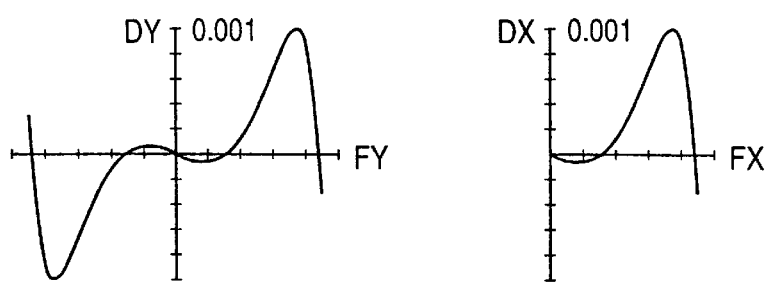
FIG. 30B shows the on-axis aberration occurring in it.

FIGS. 16A to 28B correspond to Examples 16 to 28, respectively. These FIGS. 16A, 17A, 18A, . . . , 28A show the lens configuration, and FIGS. 16B, 17B, 18B, . . . , 28B shows the on-axis aberration. In the lens configuration shown by these figures, reference numeral 1 represents the graded-index lens, 2 the homogeneous plano-convex lens, and 3 the aperture-stop. In the aberration shown by these figures, DY and DX represent the amounts of ray displacement in a meridional and a sagittal direction, respectively (assuming that the radius of the graded-index lens is unity), and FX and FY each represent the distance between the incident light and the optical axis at the stop position, with the terminal end of the horizontal axis representing the radius of the stop.

As one can see from Tables 1 and 2, NA values substantially equal to 0.7 and higher can be obtained on the image side by adopting the configuration of the invention. It should be particularly noted that with the lens configurations of Examples 27 and 28, both lens surfaces of the graded-index lens are planar but in spite of this simplicity in shape, NA values of 1.48 and upward can be obtained on the image side. In Example 26, the index distribution coefficient $h_6$ is set to −0.1724, and in Example 28, the index disgribution coefficient $h_6$ is set to −0.076.

In each of Examples above, the aperture-stop is positioned on the object side of the graded-index lens but this is not necessarily the case with the present invention which utilizes only the image near the optical axis; in the actual optics, the aperture-stop may be positioned between the graded-index lens and the homogeneous plano-convex lens or on the image side of the homogeneous plano-convex lens. If desired, the aperture-stop may be shaped like a frame that is formed integral with the lens holder and so forth.

Figure 31A:
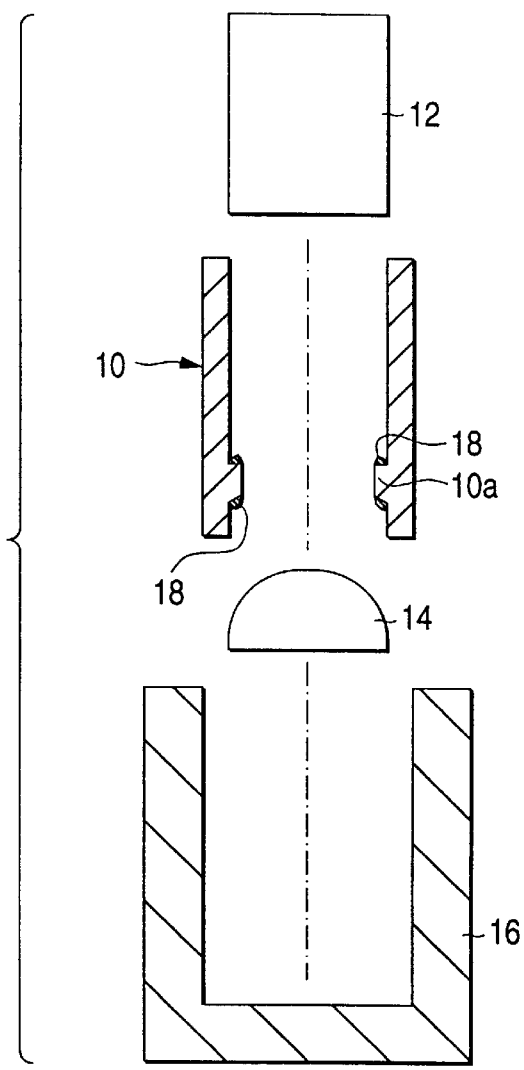
FIGS. 31A and 31B illustrate an example of the sequence of assembling the objective lens optics according to the embodiments of the invention.
Figure 31B:
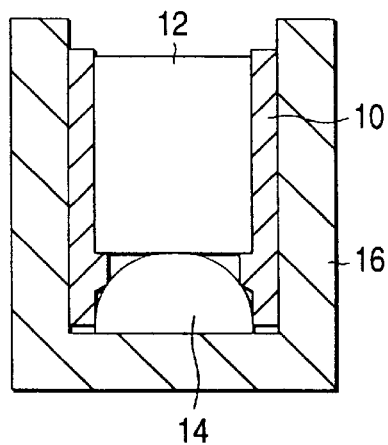

When making a commercial product of the objective lens optics of the invention, the graded-index lens and the homogenous plano-convex lens have to be assembled in an integral unit, with their optical axes aligning with each other. The sequence of assembling the two lenses is shown in FIGS. 31A and 31B. A cylindrical lens holder 10 is employed in the assembling process. The lens holder 10 has an inside diameter that is just large enough to admit the fitting of the graded-index lens 12; in addition, an annular stopper 10a also serving as the aperture-stop projects from the inner peripheral surface of the lens holder as an integral part. The upper surface of the stopper 10a is flat in correspondence with the abutting end of the graded-index lens 12 whereas the lower surface is inclined in correspondence with the convexo-spherical surface of the homogeneous plano-convex lens 14.

Figure 32:
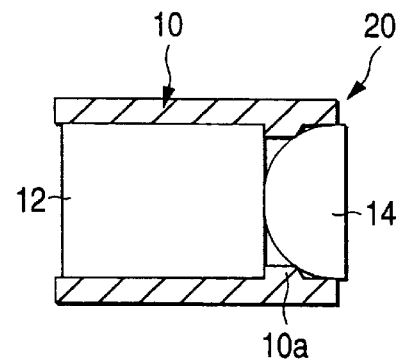
FIG. 32 shows in section the objective lens optics assembled in accordance with the sequence shown in FIGS. 31A and 31B.

The assembling operation is performed using a cup-shaped assembling jig 16. The inside diameter of the jig 16 is just large enough to admit the fitting of the lens holder 10 and the inner surface of its bottom is level to serve as a reference plane. The jig 16 is made of a material having uv (ultra-violet) transmittance such as quarts glass. The homogeneous plano-convex lens 14 is rested in intimate contact with the center of the inner surface of the bottom of the jig 16. With a uv curable resin 18 being coated on both upper and lower surfaces of the stopper 10a, the lens holder 10 is fitted into the jig 16 until the lower surface of the stopper 10a holds down the convexo-spherical surface of the homogeneous plano-convex lens 14. Thereafter, the graded-index lens 12 is inserted into the lens holder 10 until the descending end is pressed against the stopper 10a. Subsequently, tilting of the homogeneous plano-convex lens 14 is corrected appropriately and uv radiation is applied form both above and below to cure the resin (see FIG. 31B). After this curing step, a unitary form of objective lens optics 20 as shown in FIG. 32 is extracted from the jig 16.

As described on the foregoing pages, the present invention provides optics in which a graded-index lens and a homogeneous plano-convex lens are combined in such a way that the convexo-spherical surface of the homogeneous plano-convex lens is opposed to the graded-index lens. If it is used as an objective lens, NA can be increased without increasing aberrations and, in addition, the lens diameter and size can be reduced. These advantages combine to enable high-density recording on optical recording media. As a further advantage, the objective lens can be manufactured at low cost using the optics of the invention.

What is claimed is:

1. Optics using a graded-index lens, comprising:
    a single graded-index lens having a refractive index distribution in a radial direction, wherein the graded-index lens has a plane or convexo-spherical lens surface and when its refractive index distribution is expressed by $$n(r)^2 = n_0^2 \cdot \{1 - (g \cdot r)^2 + h_4(g \cdot r)^4 + h_6(g \cdot r)^6 + h_8(g \cdot r)^8 + \cdots\}$$

the following conditions are satisfied, $$1.45 \leq n_0 \leq 1.80, \text{ and}$$

$$0.45 \leq n_0 \cdot g \cdot r_0 \leq 0.90,$$

where r is the distance from the optical axis, $n(r)$ is the refractive index at the position distant by r from the optical axis, $n_0$ is the refractive index on the optical axis, $r_0$ is the radius of the graded-index lens, g is an index distribution coefficient, and $h_4$, $h_6$ and $h_8$ are index distribution coefficients; and a single homogeneous plano-convex lens having a uniform refractive index, wherein the homogeneous plano-convex lens has its convex surface rendered spherical and opposed to the graded-index lens and is disposed in such a way that its optical axis aligns with the optical axis of the graded-index lens and satisfies the following conditions, $$1.40 \leq n \leq 2.20, \text{ and}$$

$$0.3 r_0 \leq R \leq 2.0 r_0,$$

where n is the refractive index of the homogeneous plano-convex lens and R is the radius of curvature of the convex surface of the homogeneous plano-convex lens.

2. The objective lens optics according to claim 1, wherein the graded-index lens and the homogeneous plano-convex lens are assembled into an optical head in such a way that one lens surface of the graded-index lens is opposed to the convex surface of the homogeneous plano-convex lens, the other lens surface of the graded-index lens is directed to a light source, and the plane surface of the homogeneous plano-convex lens is directed toward a recording medium.

3. The objective lens optics according to cliam 2, wherein one lens surface of the graded-index lens faces to the convex surface of the homogeneous plano-convex lens, the other surface of the graded-index lens is directed to the light source, and the plane surface of the plano-convex lens is directed to the recording medium.

4. The objective lens optics according to claim 3, wherein the image side focus point is set at a space of the recording media side.

5. The objective lens optics according to claim 3, wherein the Image side focus point coincides with the plane surface of the homogeneous plano-convex lens.

* * * * *

UNITED STATES PATENT AND TRADEMARK OFFICE
CERTIFICATE OF CORRECTION

PATENT NO. : 5,949,585
DATED : September 7, 1999
INVENTOR(S) : Shigeo Kittaka

It is certified that error appears in the above-identified patent and that said Letters Patent is hereby corrected as shown below:

On the title page: Item [73]

line 3, delete "NGB Corporation, Tokyo, Japan" and insert – Nippon Sheet Glass Co., Ltd., Osaka, Japan –.

Signed and Sealed this

Fifth Day of September, 2000

Attest:

Q. TODD DICKINSON

*Attesting Officer*      *Director of Patents and Trademarks*